United States Patent [19]

Sudolnik et al.

[11] Patent Number: 4,928,733

[45] Date of Patent: May 29, 1990

[54] STEAM VALVE WITH VARIABLE ACTUATION FORCES

[75] Inventors: James M. Sudolnik, Lunenburg; Stephen R. Prince, Fitchburg, both of Mass.

[73] Assignee: General Electric Company, Schenectady, N.Y.

[21] Appl. No.: 343,236

[22] Filed: Apr. 26, 1989

[51] Int. Cl.$^5$ .............................................. F16K 1/00
[52] U.S. Cl. ........................... 137/630.13; 137/630.14
[58] Field of Search ....................... 137/630.13, 630.14

[56] References Cited

U.S. PATENT DOCUMENTS

| | | | |
|---|---|---|---|
| 2,275,132 | 3/1942 | Crosthwait | 137/630.13 |
| 3,529,630 | 9/1970 | Podolsky | 137/630.13 |
| 3,531,078 | 9/1970 | Hose | 137/630.14 X |

Primary Examiner—Robert G. Nilson
Attorney, Agent, or Firm—Nixon & Vanderhye

[57] ABSTRACT

A valve includes a device for reducing the force required beyond cracking, thereby reducing the size of actuating equipment. A balance chamber includes two effective diameters. A smaller diameter is operative during cracking, in order to maintain positive control of the valve. Later, a larger balance diameter is effective, in order to reduce the actuation forces required beyond the cracking position. A pilot valve is opened during initial actuation. Once the pilot valve is fully opened, a main valve is opened. A dual-diameter balance chamber is effective, during initial opening of the main valve, to require substantial opening forces. Then, when the main valve reaches a predetermined distance from its seat, the second effective diameter increases the balance area to reduce the valve actuating forces required.

3 Claims, 2 Drawing Sheets

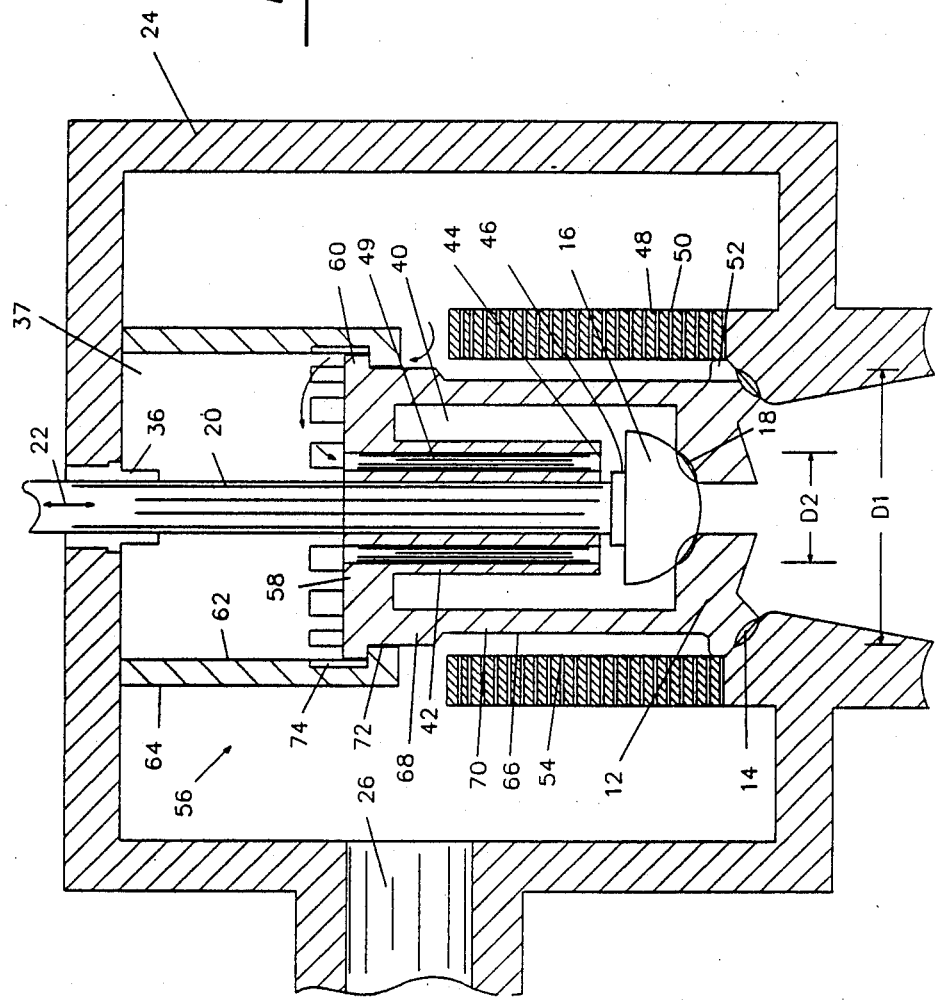

STEAM VALVE WITH VARIABLE ACTUATION FORCES

BACKGROUND OF THE INVENTION

The present invention relates to valves and, more particularly, to steam valves such as used, for example, in steam turbines for controlling the flow of steam from a steam chest to the interior of the steam turbine.

As is well known, the forces required to open a steam valve vary markedly as the steam valve moves between a closed position and an open position. This results from the dramatic change in differential pressure across the valve during the opening and closing procedure That is, when the valve is fully closed and sealed, the full steam pressure acts across the valve area in the direction tending to maintain the valve in the closed position. Countering forces from beneath the valve are minimal at this time. When the valve is fully opened, the steam pressure beneath the valve is about the same as that above the valve, and thus very little force is required to move the valve in this region.

Of particular criticality is operating the valve in the vicinity of its cracking position. From a fully closed position to a very small opening position (cracking position), the valve forces go through a very large change.

In the prior art, the large forces required to crack a steam valve are overcome using an auxiliary piston in a balance chamber. The auxiliary piston is exposed to a steam pressure related to the steam pressure to which the valve is subjected. The piston in the balance chamber exerts forces on the valve in the opening direction, whereby the valve actuator is required to provide only the difference between the closing force exerted on the valve and the opening force exerted on the auxiliary piston in the balance chamber.

Smaller required actuating forces permit the use of smaller actuating devices such as, for example, hydraulic cylinders, handwheels, and the like. This has the desirable result of reduced size and cost.

Minimum actuation forces are achieved when the opening and the closing forces are balanced. However, if the initial cracking force is made about zero by near-perfect balance, as soon as the valve plug is moved a short distance from its seat, the large change in valve force tends to apply an opening force to the valve.

The valve travel distance to achieve dramatic changes in valve actuating force in the vicinity of cracking is often in the range of clearances, tolerances and deflections in the valve construction. Perfect balance in the valve when closed would result in a seriously out-of-balance condition in the cracked position The resulting change in force vectors can cause the valve plug to flutter or vibrate, thus leading to unstable control, noise, and rapid wear of the parts.

Thus, stable valve operation requires a substantial imbalance in the closing direction of the closed valve, such that an imbalance in the closing direction remains during, and beyond cracking. This requires an actuator capable of exerting a substantial force to overcome the imbalance. Substantially beyond the cracking position, of course, the force requirements are reduced substantially. In the prior art, however, the same actuating force is available, but is not required, once the valve is beyond its cracking position.

A further prior-art technique employs a pilot valve associated with a main steam valve. The pilot valve is opened first, then the main steam valve is opened. This two-step procedure at least partly alleviates the problem of the large changes in actuating force taking place in the vicinity of the closed position.

OBJECTS AND SUMMARY OF THE INVENTION

It is an object of the invention to provide a valve actuating system that overcomes the drawbacks of the prior art.

It is a still further object of the invention to provide a valve actuating system which reduces forces required to crack open a valve.

It is a still further object of the invention to provide a balance device for a steam valve in which a smaller effective area in a balance chamber reduces forces required to open the steam valve in the vicinity of the cracking point. Beyond the cracking point, where large changes in valve force over short distances are not experienced, a larger effective area of the balance chamber further reduces valve forces, whereby a large reduction in valve actuating force is attained over the major portion of the valve stroke.

It is a still further object of the invention to provide a steam valve system including a two-area balance cylinder and a main steam valve having a pilot valve associated therewith. The pilot valve is opened first Then, the main steam valve is opened aided by balancing forces from a first effective area of the balance cylinder Finally, the balancing forces are increased when the second effective area of the balance cylinder becomes effective. Thus, until the second effective area comes into use, substantial force is required for actuating the main steam valve, as is required for stability in the critical operating region near crack-open. Once the second effective area is in use, reduced actuation force is required.

Briefly stated, a steam valve includes a device for reducing the force required beyond cracking, thereby reducing the size of actuating equipment. A balance chamber includes two effective diameters. A smaller diameter is operative during cracking, in order to maintain positive control of the valve. Later, a larger balance diameter is effective, in reducing the actuation forces required beyond the cracking position. A pilot valve is opened during initial actuation Once the pilot valve is fully opened, a main valve is opened. A dual-diameter balance chamber is effective, during initial opening of the main valve, to require substantial opening forces. Then, when the main valve reaches a predetermined distance from its seat, the second effective diameter increases the balance area to reduce the valve actuating forces required According to an embodiment of the invention, there is provided a steam valve comprising: a main valve, a main valve seat, a balance cylinder, a balance piston in said balance cylinder, means for transmitting a balancing force from said balance piston to said main valve, means for permitting steam to act on said balance piston in a direction tending to open said steam valve, said balance cylinder includes first and second effective diameters, said balance piston includes a third diameter at least partly sealable to said first effective diameter, said balance piston includes a fourth effective diameter at least partly sealable to said second effective diameter, means for permitting said first and third effective diameters to control said balancing force when said main valve is within a predetermined distance from said main valve seat, means for permitting said second and fourth diameters to control said balancing force when said main valve is more than said predetermined distance from said main valve seat, and said first effective diameter is smaller than said second effective diameter, whereby a valve actuating force is substantially reduced when said main valve is more than said predetermined distance from said main valve seat.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2 is a cross section of a steam valve according to an embodiment of the invention.

DETAILED DESCRIPTION OF THE PREFERRED EMBODIMENT

Figure 1:
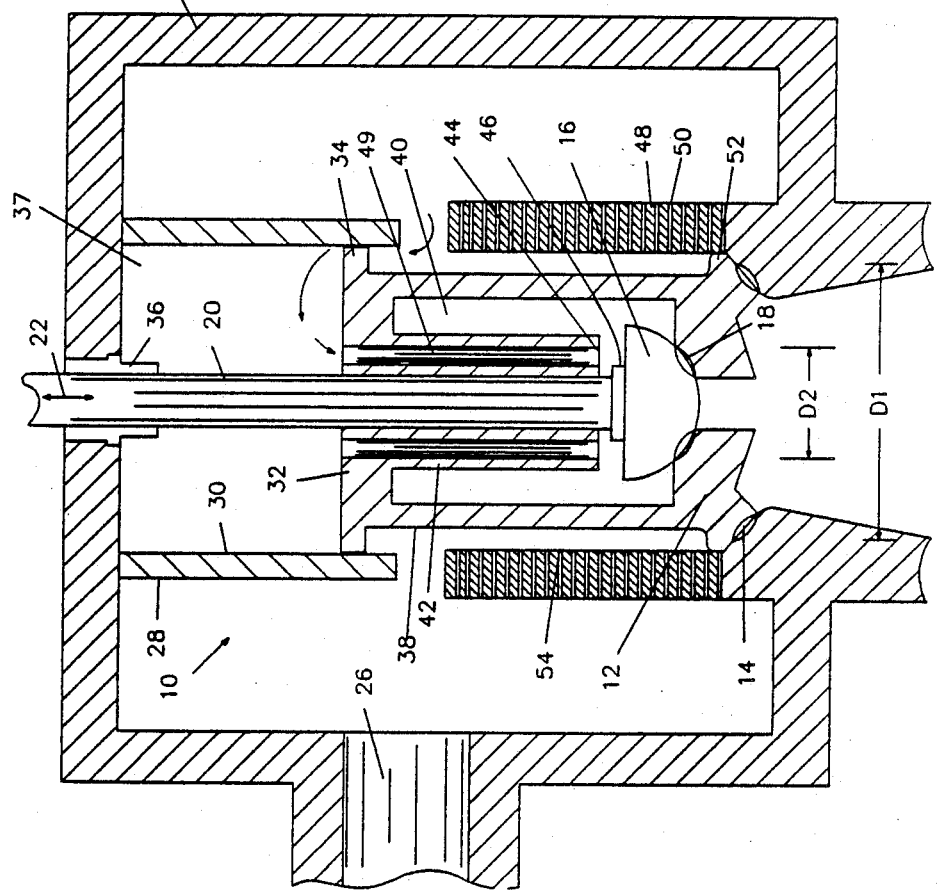
FIG. 1 is a cross section of a steam valve according to the prior art

Referring to FIG. 1, there is shown, generally at 10, a steam valve according to the prior art. A main valve 12, in its closed position, contacts a main valve seat 14. A diameter D1 defines an effective area of main valve 12, when closed.

A pilot valve 16 engages a pilot valve seat 18 centered in main valve 12. A diameter D2 defines an effective area of pilot valve seat 18. A valve stem 20 is moved by a conventional external valve actuator (not shown) in a direction indicated by a double-headed arrow 22. It is to be noted that the diameter D2 is substantially smaller than the diameter D1.

A valve enclosure 24, surrounding steam valve 10, includes a steam port 26 for admitting steam to steam valve 10. A balance sleeve or cylinder 28 includes a cylindrical inner surface 30. A balance piston 32 includes a sealing flange 34 which makes a partial seal against cylindrical inner surface 30. A shaft seal 36 permits valve stem 20 to slide in and out of the balance sleeve or cylinder 28 without substantial leakage. Together, balance piston 32, balance cylinder 28 and shaft seal 36, with an enclosed portion of valve enclosure 24, form a balance chamber 37.

A sleeve 38 integrally connects balance piston 32 to main valve 12, thus forming a chamber 40 therebetween. An inner sleeve 42, dependent from balance piston 32 surrounds and guides valve stem 20. A lower end 44 of inner sleeve 42 faces an upper abutment surface 46 of pilot valve 16 spaced a short distance therefrom in the closed condition shown. A plurality of holes 49 extend through balance piston 32 communicating balance chamber 37 with chamber 40.

A cylindrical valve trim 48 includes a plurality, typically thousands, of perforations 50 passing therethrough. An outer perimeter 52 of main valve 12 engages an inner surface 54 of valve trim 48 in a sliding fit.

As noted in the foregoing, the fit between sealing flange 34 and cylindrical inner surface 30 produces only a partial seal. Accordingly, some steam is enabled to flow past this seal into balance chamber 37.

In operation, when steam valve 10 is in the fully closed condition, leakage of steam past the partial seal formed by sealing flange 34 and cylindrical inner surface 30 permits the pressure in balance chamber 37 and chamber 40 to equal the main steam pressure entering valve enclosure 24 through steam port 26.

With the initial upward movement of valve stem 20, pilot valve 16 is unseated from pilot valve seat 18. This reduces the steam pressure in chamber 40 and balance chamber 37 to a value below that of the main steam pressure in valve enclosure 24. This reduced pressure acts on the upper surface of balance piston 32, whereas the main steam pressure acts on the lower surface of balance piston 32, thereby producing a net upward force tending to move main valve 12 upward. At this time, the remaining seal between main valve 12 and main valve seat 14 produces a downward force sufficient to overcome the upward force. As a consequence, main valve 12 remains sealed.

When pilot valve 16 is moved upward far enough to produce abutting contact between lower end 44 and abutment surface 46, a slight further upward movement tends to move main valve 12 upward from its seal on main valve seat 14. Steam flows through those of perforations 50 which are disposed below outer perimeter 52, thereby producing steam flow through main valve seat 14. As valve stem 20 is moved further upward, pilot valve 16 and main valve 12 move upward concertedly therewith. During this upward motion, more and more perforations 50 are passed by outer perimeter 52, and more and more steam is permitted to flow past main valve 12 to the using process. The small size and large number of perforations 50 ensure that the action is smooth and generally noiseless.

Just at the instant of opening, however, the effective area with diameter D1 producing downward force on main valve 12 is reduced slightly. This, coupled with the continued reduction of steam pressure in balance chamber 37 arising from a pressure drop across the leaky seal between sealing flange 34 and cylindrical inner surface 30, produces a reduction in the downward force on main valve 12. This change takes place over a very small upward displacement of main valve 12. Thus, a substantial force must be provided to control main valve 12 in this vicinity. As main valve 12 is moved upward beyond the crack-open position, the substantial valve-actuation force required for stability in the vicinity of the crack-open position is no longer required. Instead, a relatively small force would be sufficient. However the prior-art apparatus of FIG. 1 requires the same net force over the entire stroke of main valve 12.

From the foregoing, it is seen that providing a sufficient downward net force for valve stability in the vicinity of the crack-open position imposes higher than necessary valve actuation force in positions beyond crack-open.

Referring now to FIG. 2, where like reference numerals designate like elements, a steam valve 56 includes a balance piston 58 including a sealing flange 60 facing a cylindrical inner surface 62 of a balance sleeve or cylinder 64 which define the balance chamber 37. A sleeve 66, integrally formed between balance piston 58 and main valve 12, has a larger-diameter outer surface 68 extending a short distance downward from sealing flange 60, and a smaller-diameter outer surface 70 for the remainder of its length. An inward-directed flange 72 at the lower end of balance chamber 64 provides a partial seal with outer surface 68 when main valve 12 is closed at or near the crack-open position A plurality of grooves 74 are formed in the lower portion of cylindrical inner surface 62 which face the cylindrical outer surface of flange 60 when main valve 12 is closed or near the crack-open position.

In operation, pilot valve 16 is opened first, thus permitting a flow of steam through pilot valve seat 18 Steam leaks past the partial seal between inward-directed flange 72 and larger-diameter outer surface 68 into balance chamber 37, and thence through holes 49 to pass through pilot valve seat 18. This reduces the pressure in balance chamber 37 relative to the main steam pressure in valve enclosure 24. The differential pressure acts across the area defined by larger-diameter outer surface 68 to produce an upward-directed component of force to partly oppose the downward force exerted by the steam pressure on main valve 12. As in the prior-art device, the total force on main valve 12 provides a substantial downward remainder to maintain stable control of main valve 12. Grooves 74 prevent interference with the flow of steam after it has passed inward-directed flange 72.

After main valve 12 and balance piston 58 move upward beyond the crack-open position, smaller-diameter outer surface 70 moves upward to face inward-directed flange 72. At the same time, sealing flange 60 passes the top edges of grooves 74. This permits substantially unrestricted steam flow past inward-directed flange 72 and provides partial sealing between sealing flange 60 and cylindrical inner surface 62. In this situation, the differential pressure aiding upward balance acts across the relatively larger area defined by sealing flange 60. Thus, beyond the crack-open position, a greater balancing force is generated by steam valve 56, as is desired.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A steam valve comprising:
    a main valve;
    a main valve seat;
    a balance cylinder;
    a balance piston in said balance cylinder;
    means for transmitting a balancing force from said balance piston to said main valve;
    means for permitting steam to act on said balance piston in a direction tending to open said steam valve;
    said balance cylinder includes first and second effective diameters;
    said balance piston includes a third effective diameter at least partly sealable to said first effective diameter;
    said balance piston includes a fourth effective diameter at least partly sealable to said second effective diameter;
    means for permitting said first and third effective diameters to control said balancing force when said main valve is within a predetermined distance from said main valve seat;
    means for permitting said second and fourth diameters to control said balancing force when said main valve is more than said predetermined distance from said main valve seat; and
    said first effective diameter is smaller than said second effective diameter, whereby a valve actuating force is substantially reduced when said main valve is more than said predetermined distance from said main valve seat.

2. A steam valve according to claim 1, wherein said balancing force produced by said first effective diameter is small enough to permit a positive closing force to remain on said main valve at all positions thereof when said main valve is within said predetermined distance from said main valve seat.

3. A steam valve according to claim 1 wherein said means for permitting steam to act on said balance piston includes:
    a pilot valve in said main valve;
    a sleeve connecting said balance cylinder to said main valve and forming a chamber therein;
    said chamber enclosing said pilot valve;
    means for communicating steam from said balance cylinder to said chamber; and
    said balance piston being effective for reducing a pressure of said steam moving therepast into said balance cylinder, whereby a reduced steam pressure exists in said balance cylinder, a pressure difference between steam outside and inside said balance cylinder being effective for acting across an area defined by one of said second and fourth diameters to partly balance a force required to open said main valve.

* * * * *